(12) United States Patent
Kim et al.

(10) Patent No.: US 11,393,356 B2
(45) Date of Patent: Jul. 19, 2022

(54) CONFIGURABLE PLATFORM FOR CONDUCTING EXPERIMENTS IN SPACE

(71) Applicant: Valley Christian Schools, San Jose, CA (US)

(72) Inventors: Danny Kim, San Jose, CA (US); Shih-jen Hwong, Atherton, CA (US); Stephen Anthony Huber, San Jose, CA (US); Mihir Kasmalkar, San Jose, CA (US); Micah Kim, San Jose, CA (US)

(73) Assignee: Valley Christian Schools, San Jose, CA (US)

( * ) Notice: Subject to any disclaimer, the term of this patent is extended or adjusted under 35 U.S.C. 154(b) by 22 days.

(21) Appl. No.: 17/071,753

(22) Filed: Oct. 15, 2020

(65) Prior Publication Data

US 2021/0027651 A1    Jan. 28, 2021

Related U.S. Application Data

(63) Continuation of application No. 15/900,530, filed on Feb. 20, 2018, now Pat. No. 10,854,102.

(60) Provisional application No. 62/461,362, filed on Feb. 21, 2017.

(51) Int. Cl.
*G09B 19/00* (2006.01)
*G09B 5/00* (2006.01)

(52) U.S. Cl.
CPC .............. *G09B 19/00* (2013.01); *G09B 5/00* (2013.01)

(58) Field of Classification Search
CPC ............ G09B 5/00; G09B 19/00; G09B 9/00
See application file for complete search history.

(56) References Cited

U.S. PATENT DOCUMENTS

| | | | |
|---|---|---|---|
| 4,771,971 | A | 9/1988 | Ludwig et al. |
| 5,020,743 | A | 6/1991 | Von et al. |
| 5,152,482 | A | 10/1992 | Perkins et al. |
| 5,839,696 | A | 11/1998 | Caplin et al. |
| 6,175,783 | B1 | 1/2001 | Strength et al. |
| 6,718,776 | B2 | 4/2004 | Wessling et al. |

(Continued)

OTHER PUBLICATIONS

"U.S. Appl. No. 15/900,530, Examiner Interview Summary dated Jul. 2, 2020", 2 pgs.

(Continued)

*Primary Examiner* — Timothy A Musselman
(74) *Attorney, Agent, or Firm* — Schwegman Lundberg & Woessner, P.A.

(57) ABSTRACT

Embodiments provide experiment platforms comprising hardware, software, and user-specified data structures for user-conducted orbital experiments-by-proxy that focus on microgravity as a variable. The experiment is repeated in normal gravity as a control, on a similar platform that may or may not have been constructed and/or programmed by the user. Differences in experimental results performed by similar platforms are thus attributed to the influence of gravity on observed phenomena. Experiments are specified by user-defined data structures which govern the operation of control programs typically previously installed on orbital and ground hardware. Experimentation by proxy and parameter specification allows earthbound students to participate in space-based research at various levels of involvement and at sharply reduced cost, encouraging interest in science and technology in education and future work.

20 Claims, 7 Drawing Sheets

(56) References Cited

U.S. PATENT DOCUMENTS

| | | |
|---|---|---|
| 7,254,039 B2 | 8/2007 | Sandy |
| 8,096,512 B2 | 1/2012 | Russell |
| 8,888,050 B1 | 11/2014 | Murphy et al. |
| 9,206,383 B2 | 12/2015 | Vunjak-Novakovic et al. |
| 9,231,691 B2 | 1/2016 | Atkinson et al. |
| 9,813,151 B2 | 11/2017 | Kingsbury et al. |
| 2001/0056472 A1 | 12/2001 | Chafer |
| 2004/0016393 A1 | 1/2004 | Carter |
| 2004/0188562 A1 | 9/2004 | Mueller et al. |
| 2006/0058023 A1 | 3/2006 | White et al. |
| 2007/0029446 A1 | 2/2007 | Mosher et al. |
| 2008/0078886 A1 | 4/2008 | Foster et al. |
| 2018/0240355 A1 | 8/2018 | Kirn et al. |

OTHER PUBLICATIONS

"U.S. Appl. No. 15/900,530, Non Final Office Action dated Apr. 3, 2020", 7 pgs.

"U.S. Appl. No. 15/900,530, Notice of Allowability dated Sep. 30, 2020", 3 pgs.

"U.S. Appl. No. 15/900,530, Notice of Allowance dated Sep. 4, 2020", 6 pgs.

"U.S. Appl. No. 15/900,530, Preliminary Amendment filed Mar. 1, 2018", 7 pgs.

"U.S. Appl. No. 15/900,530, Response filed May 28, 2020 to Non Final Office Action dated Apr. 3, 2020", 9 pgs.

"How to Build a Nanoracks Payload: Nanolabs", [Online], Retrieved from the Internet: <URL: http://nanoracks.com/wp-content/uploads/Current_edition_of_Interface_Document_for_NanoRacks_Internal_Platforms_1A_2A_NanoLab_Modules.pdf>, (Feb. 13, 2014), 15 pgs.

"ISS Facility Brochure: Research in Space 2017 and Beyond", NASA ISS Program Science Office. NP-2017-04-014-B-JSC, [Online]. Retrieved from the Internet: <URL: https://www.nasa.gov/mission_pages/station/research/benefits/index.html>, (Dec. 20, 2017), 112 pgs.

"NanoRacks Experiment Overview", [Online]. Retrieved from the Internet: <URL: nanoracks.com/wp-content/uploads/NanoRacks-Experiment-Overview.pdf>, (Apr. 20, 2010), 16 pgs.

"NanoRacks Internal Platforms 1A/2A and NanoLab Modules Interface Control Document", Document: NR-SRD-108. Revision 0.4, [Online]. Retrieved from the Internet: <URL: http://www.dlr.de/rd/Portaldata/28/Resources/dokumente/rm/NanoLabInterface.pdf>, (Feb. 13, 2014), 14 pgs.

"NASA—Experiments by Hardware", [Online]. Retrieved from the Internet: <URL: https://www.nasa.gov/mission_pages/station/research/experimentstexperiments_hardware.html#Educational-Activities>, (Accessed Feb. 15, 2018), 32 pgs.

"Student Spaceflight Experiment Program", A Program of the National Center for Earth and Space Science Education. rthur C. Clarke Institute for Space Education and NanoRacks, LLC, [Online]. Retrieved from the Internet: <URL: http://ssep.ncesse.org/>, (Jan. 26, 2017), 2 pgs.

Baker, Amanda, "Not Your Grandma's Science Competition—Part 2", Frontiers for Young Minds, [Online]. Retrieved from the Internet: <URL: https://blogs.scientificamerican.com/frontiers-for-young-minds/not-your-grandma-8217-s-science-competition-8211-part-2/>, (Feb. 17, 2015), 19 pgs.

Stenzel, Steven, "NanoRacks External Platform (NREP) Interface Definition Document (IDD)", NanoRacks. Doc No. NR-NREP-S0001; Rev: B., (Nov. 18, 2016), 82 pgs.

Stenzel, Steven, "NanoRacks Kaber Deployment System Interface Definition Document", NanoRacks .Doc No. NR-KABER-S0001, [Online]. Retrieved from the Internet: <URL: http://nanoracks.com/wp-content/uploads/NanoRacks-Kaber-Deployment-System-IDD.pdf>, (Mar. 17, 2016), 63 pgs.

US 11,393,356 B2

CONFIGURABLE PLATFORM FOR CONDUCTING EXPERIMENTS IN SPACE

RELATED APPLICATIONS

This application is a continuation of and claims the benefit of priority to U.S. patent application Ser. No. 15/900,530, entitled "Configurable Platform For Conducting Experiments In Space," filed on Feb. 20, 2018, which is hereby incorporated by reference herein in its entirety and claims the benefit of the priority date of commonly-assigned provisional patent application U.S. Ser. No. 62/461,362, filed on Feb. 21, 2017, and entitled "Configurable Platform For Conducting Experiments In Space," which is also hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright, 2015-2018 The Quest Institute and Valley Christian Schools, All Rights Reserved.

TECHNICAL FIELD

The disclosed technology relates generally to modular programmable instrumentation platforms for performing automated scientific and educational experiments. More particularly, such platforms may be aboard orbiting spacecraft and may be governed by dynamically reconfigurable control programs and user-defined data structures.

BRIEF DESCRIPTION OF DRAWINGS

Some embodiments are illustrated by way of example and not limitation in the figures and views of the accompanying drawings.

DETAILED DESCRIPTION

Figure 1:
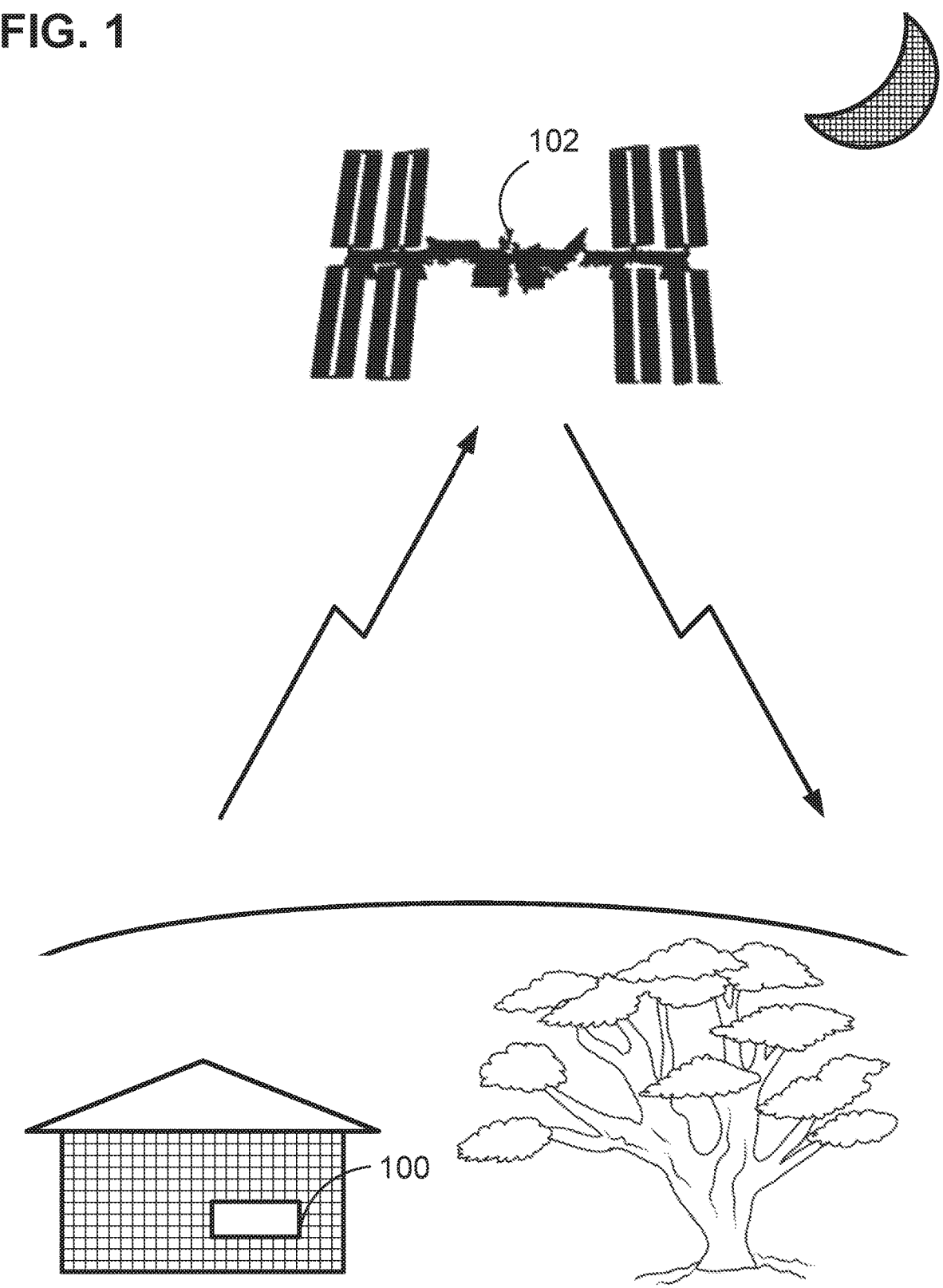
FIG. 1 shows a diagram of an experimental platform on Earth and a corresponding orbiting experimental platform capable of performing a similar experiment and communicating results electronically, according to an embodiment.

In the following description, for purposes of explanation, numerous specific details are set forth in order to provide a thorough understanding of some example embodiments. It will be evident, however, to one skilled in the art that the present invention may be practiced without these specific details.

The International Space Station (ISS) orbits roughly two hundred miles above the Earth and serves as a focal point for research that is infeasible to conduct elsewhere. The ISS is in a state of free fall, providing a long-term habitable environment for scientific investigation into the effects of microgravity (i.e., an absence of the familiar Earth-surface gravitational acceleration) on various scientific phenomena. At present, however, only astronauts such as pilots and mission specialists can physically travel to the ISS. Other people who are unable to travel there physically conduct scientific activities on the ISS remotely, often via custom-built orbital experimental equipment and communications links.

The inventors have recognized that space-based experimentation should not be limited to governments, corporations, or universities. Similarly, participation in space-based research should not be available only to graduate student teams who may spend a year or more building customized apparatus that is (eventually, maybe) flown on relatively short duration missions. Instead, ordinary elementary, junior high, and high school students (and others, all generally termed "users" in this application) should be able to participate in microgravity activities, essentially anywhere at any time and at very low cost.

Any organization currently executing research work on the ISS encounters many significant obstacles, including but not limited to:

Apparatus transportation: SpaceX and Orbital ATK currently administer the resupply flights that travel to the ISS with experimental hardware. These flights are frequently delayed and irregular. Delays can have an adverse impact on student participation. Delays and other disappointments squelch the anticipation and therefore the student mental engagement. Further, student classes or teams may dissolve and thus may no longer be available to finalize a project once experimental results are returned. This results in unfinished investigations. Users need increased availability of orbiting experimental equipment. Ideally, the equipment would stay aboard ISS permanently.

Costs: The current cost of getting a minimum standard sized (10 cm cube) experiment apparatus to the ISS is approximately 125,000 dollars. Integration partners provide experiment safety review and integration, communication, and installation services for each launch, at some cost. Batteries and pressure vessels (e.g., CO2 cartridges) draw special scrutiny for ISS safety issues, so expensive hardware revisions may be required. There are significant fees for lifting mass up to the ISS, for lowering mass down from the ISS, and for operation of the experiments once onboard. Users need an effectively reduced cost of orbiting experimental equipment.

Scalability: The amount of space available for experimentation on the ISS is limited. At present, flight hardware typically stays onboard the ISS for thirty days and is then returned to ground. Users need orbiting experimental equipment that is quite small and can be kept in use essentially constantly, so more experiments can be performed in the available ISS volume per mission day.

The inventors have recognized for the reasons described above that there is a need for modular, scalable, and easy-to-learn experiment platforms for use in scientific and education experimentation in space environments. Embodiments to address this need are described herein. Some embodiments may run experiments in space autonomously using a generic experiment platform which may be modified or adapted by software or operating parameter uploads from Earth to execute different kinds of experiments.

FIG. 1 shows a diagram of an experimental platform 100 on Earth and a similar orbiting experimental platform 102 capable of performing the same experiment and communicating results electronically, according to an embodiment. Platform 102 may be installed aboard a space station like the ISS in orbit around the Earth. However, this example is not limiting, as other experimental platforms described may be in orbital free fall around other gravitating bodies, such as the sun, the moon, other planets. Platforms may even be deployed in an aircraft performing parabolic descent maneuvers that briefly simulate the weightlessness of orbit.

In the ideal scenario, platform 100 and platform 102 are identical in all respects (e.g., in terms of hardware, software, and experimental operating parameters), such that any differences in experimental results may be solely attributed to the difference in net gravitational acceleration experienced by each experiment platform. Standardized experiment modules may be developed to perform different types of experiments illustrating particular concepts of science and engineering. For example, the experiment module variants may enable exploration of radiation and absorption, natural convection, forced convection, heat conduction, fluid mechanics including ferrofluid behavior, humidity effects, crystal growth, plant growth, bacteria growth, plating metal in space, and so forth.

Figure 2:
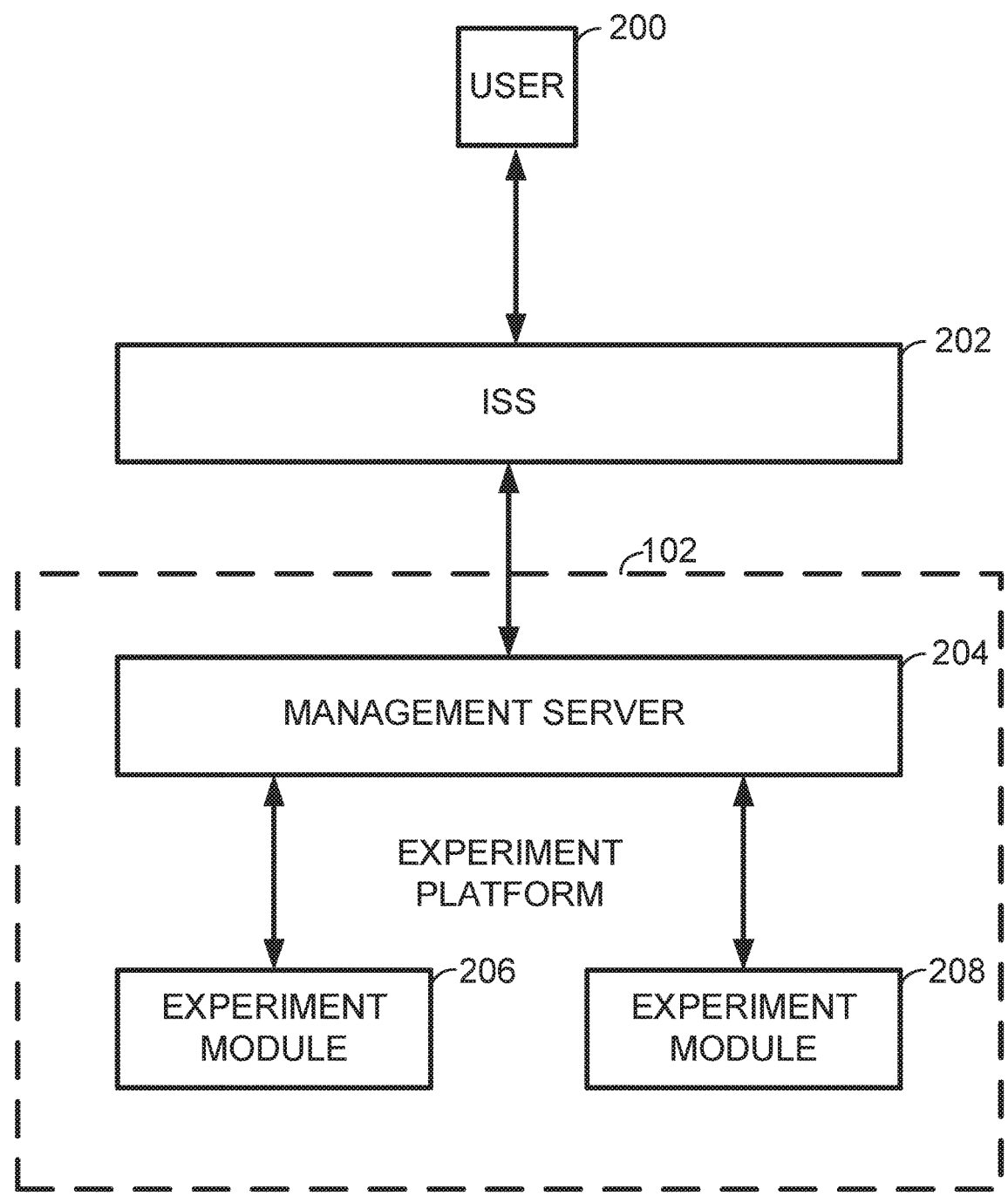
FIG. 2 shows a diagram of logical relations between a user, a space station, and an experiment platform including a management server and a number of experiment modules, according to an embodiment.

FIG. 2 shows a diagram of logical relations between a user 200, a space station 202, and an experiment platform 102 including a management server 204 and a number of experiment modules (206, 208), according to an embodiment. "Module" in this application refers to a physically, thermally, and electrically connectable hardware apparatus for either performing an experiment or for managing other modules that do so. The user 200 may upload a program for one or more of the experiment modules (206, 208) to the space station (e.g., the ISS) 202. The user 200 may also upload a user-defined data structure for use by one or more of the experiment modules (206, 208) to the space station 202. The user-defined data structure is typically a small file, so use of a control program that is already installed in an experiment module saves communication bandwidth.

The user 200 may generally not have the capability to modify or reprogram the operations of the space station 202. The space station 202 may download experimental data originating in one or more of the experiment modules (206, 208) to the user 200. Such downloads may be performed in response to a request, periodically, or in substantially real-time. Measured data may thus generally comprise acquired data to be stored or prepared for transmission or transmitted to a user. Measured data may be visualized and analyzed via an enterprise-ready cloud-based tool such as Microsoft Azure™.

The management server 204 may comprise a number of hardware-implemented processors and memories (both volatile and non-volatile), and program instructions stored in those memories. The instructions may comprise programs that are created and/or installed by an application developer or an integration partner, for example. Although in the past, the user 200 has sometimes created programs for the management server 204 as part of a custom-designed platform development process, this is generally not the case in the current embodiments.

The management server 204 may support a number of experiment modules (206, 208) by performing a variety of services that are generally not specialized to a particular experiment. For example, the management server 204 may coordinate data transfer to the space station 202 for the experiment modules (206, 208), and may transmit requests to the space station 202 for services that the space station 202 may provide.

The user 200 may, but need not, create a program for an experiment module (206, 208) to govern the execution of an experiment to be performed. If the user does not create an experiment program, the user 200 may instead simply customize an already-existing experiment module "template" program by providing particular data structures that direct the particular sequence of operations to be performed by such an existing program. The experiment program may be customized for a particular variant of experiment module designed to perform a specific type of experiment. For example, user-defined data structures may inform experiment module 208 to heat up an experimental apparatus to study heat conduction by switching on a halogen lamp, and then to trigger a particular temperature sensor to monitor the temperature of the experimental apparatus. The user-defined data structure may dictate a duration of the heating, the temperature desired, etc.

For example, natural convection is strongly dependent on gravity. Heated volumes of fluid (gas or liquid) typically become less dense than cooler volumes of such fluid. Gravity may thus exert less downward force on the reduced mass of such heated volumes than it does on the cooler volumes. The result is the buildup of convective fluid motion, which may be used to keep experimental apparatus cool. In microgravity, however, such natural gravity-driven convection does not occur, so forced convection or conduction of heat become more important for cooling equipment. Simple experiments performed both on Earth and in orbit may illustrate this phenomenon to students.

The user-defined data structure may coordinate other actuator and sensor commands made available by the experiment module program in a sequence, and may provide operating constraints that may trigger other events. For example, the data structure may specify that the temperature sensor activated after the halogen lamp was switched on should trigger another actuator and/or another sensor when the measured temperature data reaches a threshold value.

The experiment module (206, 208) may include its own hardware-based processors and memories storing both program instructions and the user-defined data structures, which may each be provided via the management server 204. Each experiment module (206, 208) may comprise a number of actuators and sensors as well as its own memories and a processor for executing a set of stored instructions to perform specific operations that comprise a particular experiment. An actuator may comprise a switch, a solenoid, a valve, a voltage meter, a piezoelectric device, a motor, a fan, a heater, a thermoelectric cooler, a pump, a light source, a flat-panel display, a speaker, and a smoke alarm. A sensor may comprise a digital camera, a video camera, a microphone, a spectrophotometer, a gyroscope, an airflow sensor, a resistance meter, a capacitance meter, a radio frequency sensor, a magnetic sensor, a carbon dioxide sensor, an oxygen sensor, a thermometer, an accelerometer, a humidity sensor, a smoke detector, a pressure sensor, a contact sensor, and a radiation sensor.

An experiment module intended for operation aboard an orbiting spacecraft, such as the ISS for example, may be referred to as the "flight unit." The flight unit is at least functionally similar to a corresponding "ground unit" that is intended for operation in a control environment such as a school classroom. The ground unit is typically used for design and development of a particular experiment's control program and related data structures and documentation.

The completed experiment module control program and possibly data structures may then be tested and integrated into the flight unit, which may then shipped be to an integration partner for further testing and payload integration. Once the launch of a set of experiment modules occurs, the payload reaches the ISS and is unpacked and plugged into the space station's systems. The flight units are then online and ready for operation.

The embodiments therefore comprise a software model that provides an easy-to-use graphical programming interface, a common hardware for all users for a particular experiment variant, and a substantially real-time link for an upload of experiment programs and/or data structures and a download of measured experimental data.

The inventors have also recognized that if the flight units are retained aboard on the ISS for substantially continuous operation, the need for multiple payload launches may be eliminated. Further, under the approach described in this application, only new user experiment module control programs or data structures need to be uploaded to the existing orbiting flight unit (after thorough testing). That is, users may elect not to build a flight unit at all, but may choose to instead use a ground unit as a test bench for specifying an experiment to be performed by proxy via a flight unit already in orbit, with real measured results to then be transmitted back. This approach may remove the difficulties associated with experiment platform design, construction, and transportation to the ISS, and reduce up-mass, down-mass, and operational costs. The ground unit may be built by a user, or programmed by the user from scratch, or merely customized by user specification of a data structure for a pre-existing experiment module "template" program.

This application thus describes a new and distinctive delivery model that may significantly increase the effective reach to users around the world, provide personal real-time experimentation and data analysis capability in a variety of scientific fields, and reduce costs more than has been previously foreseen. Embodiments described in this application enable student users to run experiments per their specifications aboard the ISS, collect data, and analyze findings. Enabling young scientists, engineers, and programmers to participate in microgravity research, at whatever level of involvement they choose, may help impart a sense of awe and wonder that will motivate further interest in science.

Participation with space-related hands-on science education exercises may help users foster collaborative discovery and exploration. Further, the widespread availability of orbital experimental projects may encourage engineers and scientists from industry to mentor student users. Both groups may enjoy planning the operation of experiments to be performed by equipment aboard the ISS, and then monitoring and analyzing the results (ideally in substantially real-time). Involvement in such activities may help students learn more about themselves, their community, and their place in the world. Success in today's workplace requires high levels of creativity, innovative thinking, and communication skills, all of which could be developed with such an experiment-by-proxy based educational program.

The embodiments may be developed by non-profit organizations, youth-serving organizations, commercial corporations, and government entities. The embodiments may be of particular utility to upper elementary, junior high, and high school classrooms, and after-school programs. Users who would not otherwise have access to a space-based curriculum in a regular classroom setting, such as low-income persons, racial/ethnic minorities, and first-generation students, could now have such access at low cost. The inventors hope to inspire future scientists, mathematicians, and engineers, all while preparing them for high school and college and equipping them to become leaders of innovation.

Students may learn about the scientific method by formulating hypotheses that should have clearly different outcomes when tested on the flight unit versus the ground unit. Different experimental conditions (i.e., the presence or absence of net gravitational acceleration) should be the sole cause for different results obtained by the different experimental modules. Further, the experiments may be repeatable during a user's allocated experimental time slot to confirm that the results were not anomalies.

The engineering design process of the ground unit, including mechanical, electrical, and software engineering, may teach the student exactly how the flight unit will operate. However, even if the student did not build the actual flight unit that performs the experiment, the student may still learn scientific concepts in an incremental and inspirational way. By focusing on the experiment rather than the platform, this more limited approach may still bring theory and practice together across a wide range of disciplines. The approach described in this application may thus transform the way that students think about education to bring out the scientist in every student.

The use of the experiment modules alone may be part of a curriculum that is designed to illustrate the bigger ideas of scientific analysis so that students may engage, reflect, and be transformed into inventors and innovators. Various student performance indicators may be measured via surveys or other evaluation methods, to determine student self-confidence, academic performance, attitude towards school, knowledge of space-based projects, intent to attend college, and intent to seek a science-related career. Thus, in an education experimentation sense, even students who participate in only the narrower aspects of the project are themselves "flight units."

To recap, the embodiments may be part of an educational experiment development cycle that may comprise at least some of: 1) designing, building, and flight-testing a remote experiment module with its related communication infrastructure, 2) creating a ground-based version of the experiment module that may be used in classrooms, and 3) participating in the hands-on student learning activities involving use of the experiment module in comparative (i.e., normal gravity versus microgravity) trials. Further, the embodiments may enable users to change experiment configuration variables in substantially real-time, so that even users who do not build a flight unit nor write its general operating program may still practice specific discovery-based experimentation and be motivated by studying the live results from space.

The embodiments described may enable tens of thousands of student groups to design their experiments, uplink experiment module code and operating parameters, and downlink experimental data from a particular flight unit every year. For example, if each user runs a particular experiment for approximately thirty minutes, an experiment module as described in this application may theoretically perform up to 17,520 total scientific experiments in a year (i.e., 365 days/year*24 hours/day*2 experiments/hour). This number might be multiplied further if a user may repeat an experiment within their allotted time. If each user is actually a team of five students working together on the project, a single flight unit may enable up 87,600 students participate in space-based experiments per year. In one embodiment, each management server 204 may support up to 20 experiment modules (206, 208), so each management server 204 may handle over 1.75 million students per year. This approach may therefore slash costs per user and thus reach a much larger and previously-excluded group of users. Conducting an experiment in space sometime during a student's schooling could actually become a somewhat common experience.

Figure 3:
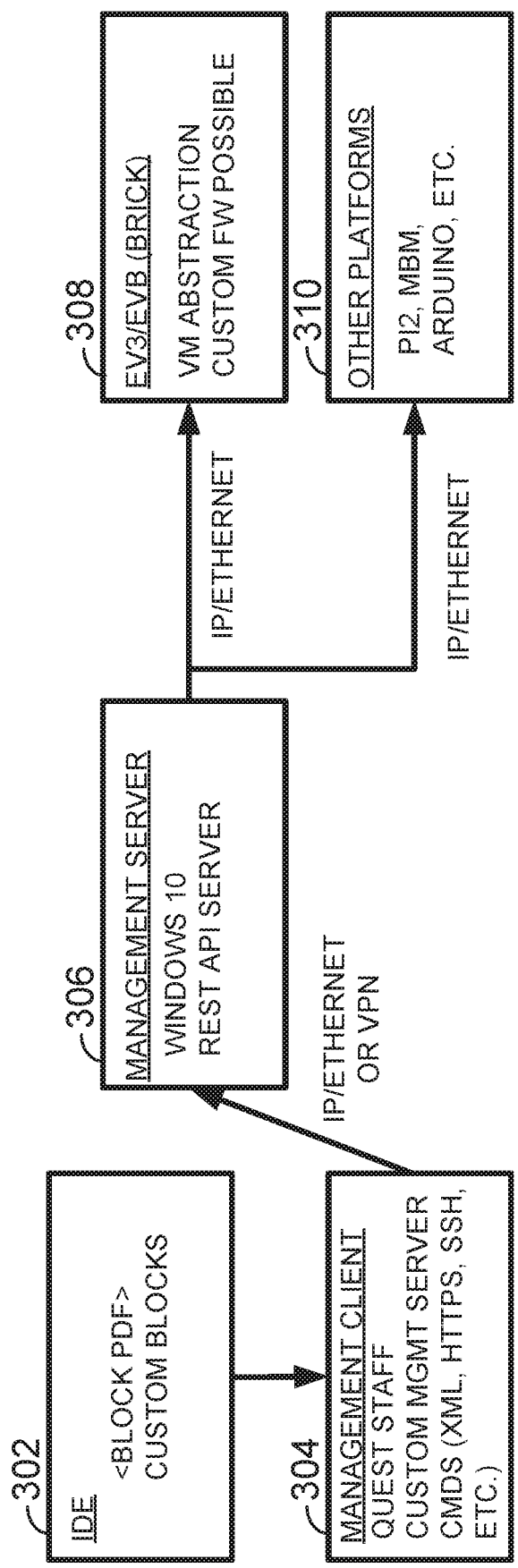
FIG. 3 shows a diagram of a software development and deployment process for the experimental platform, according to an embodiment.

FIG. 3 shows a diagram of a software development and deployment process 300 for the experimental platform 102, according to an embodiment. This embodiment of the experiment platform 102 provides a two-tier automated management system. This arrangement enables robust and redundant management of experiment module (206, 208) autonomous tasks involving actuator control actions and collected time-series sensor data. The platform architecture, design, and implementation involves two computing tiers connected with an Internet Protocol (IP) over Universal Serial Bus (USB) network, providing management of multiple autonomous tasks with redundant capability for monitoring and management of failures.

One tier (for example, an "experiments" or "autonomous task" tier) may handle tasks which may include executing science experiments on a particular experiment module (206, 208). Such tasks may comprise enabling control actions such as activating actuators (e.g., turning on heating elements or turning on cooling elements like fans), or triggering sensors (e.g., collecting time-series data such as temperature and humidity data points). A second tier (for example a "master controller" or "management" tier) may provide several experiment services via a management server 204. These services may include providing a health status of the autonomous first tier, providing data backup and access to historical data, providing pass-through manual control of control actions for troubleshooting, providing for logic updates (i.e., software program updates), and providing shared services and data collection such as high-definition video to the space station 202.

In a development/compilation step 302, in an integrated development environment (IDE), blocks of code are compiled into byte code and passed to a management client. In a deployment step 304, the development staff may execute custom management server commands to transfer the byte code and other commands to the management server 204. In one embodiment, an IP/Ethernet link or a virtual private network (VPN) may perform the transfer. In a run step 306, the management server 204 may execute the byte code and other commands to provide output to various experiment modules (308, 310).

This architecture is modular and allows for evolving technological advancements. For example, the data network may easily switch from IP over USB to IP over Ethernet, or the particular computing boards that implement each tier may be changed with little impact. Additionally, for scaling purposes, a 1:N ratio may be supported between the management tier and the autonomous task tier, i.e., every management server 204 may handle N experiment modules (206, 208). The system architecture and design may include a data network, a custom printed circuit board (PCB) for routing and multiplexing of signals as well as power management, and at least two computing boards (e.g., a Raspberry PI 3 and a Lego™ EV3).

In this regard, one embodiment of an example experiment platform 102 may include an experiment data multiplexer. The multiplexer design overcomes potential limitations imposed by particular hardware, e.g., only four sensor ports are provided in the Lego™ Mindstorms EV3 programmable system. Support for a multiple of 4× (i.e., sixteen total) sensors may be designed with the custom multiplexing adapter.

Through additional custom software, the interface remains simple and clear for end users because it utilizes a universal asynchronous receiver/transmitter (UART) interface that hides the complexities of the underlying inter-integrated circuit ($I^2C$) protocols of the experiment module sensors themselves. This arrangement effectively provides sixteen virtual sensors with no apparent complexity to the user. Thus, a sub-system is provided for multiplexing four data collection sensors into sixteen virtual data collection sensors for the Lego™ Mindstorms EV3.

Figure 4:
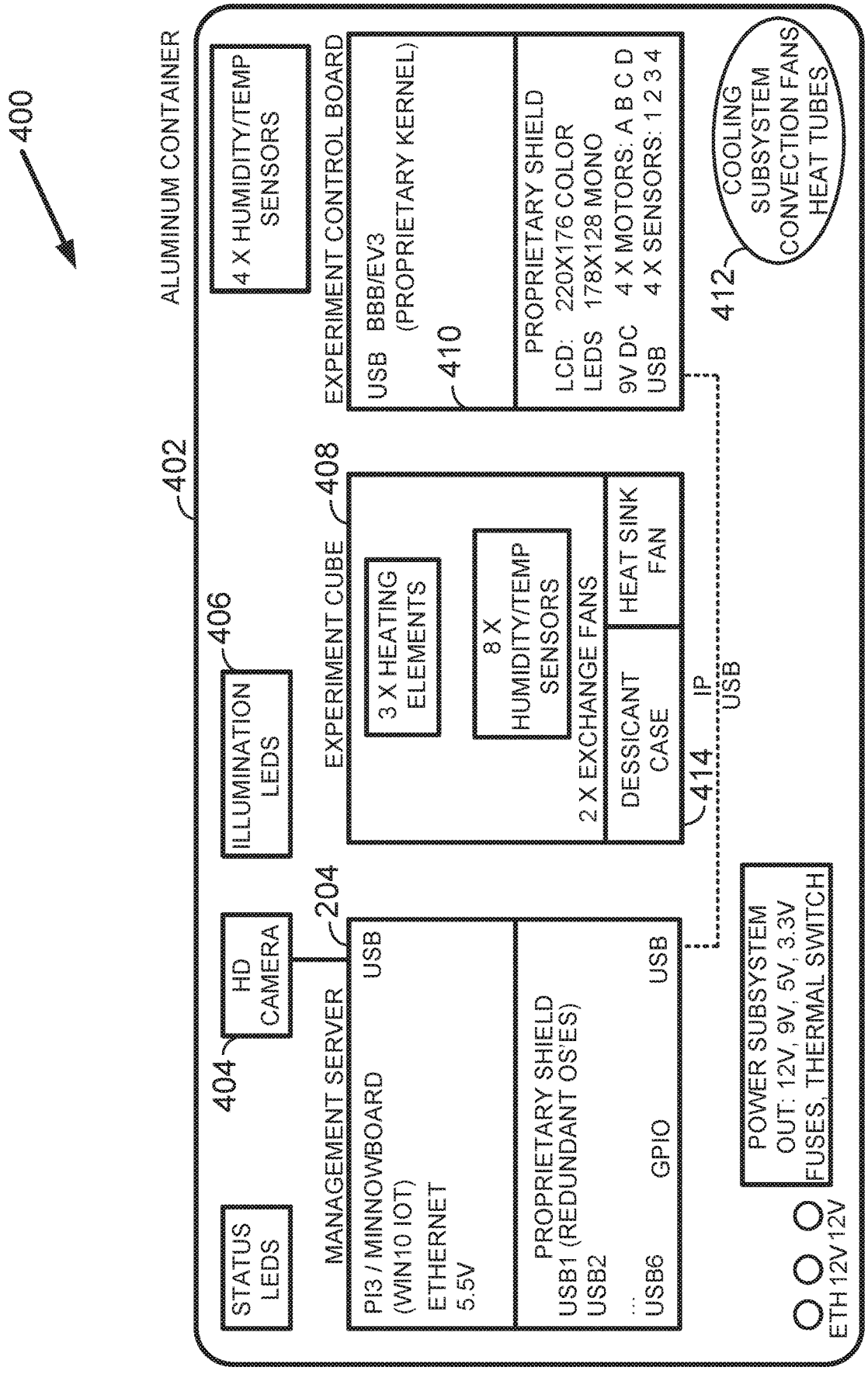
FIG. 4 shows a diagram of an experiment module, according to an embodiment.

FIG. 4 shows a diagram of an experiment module 400, according to an embodiment. In this example, management server 204 is positioned inside the same mechanical housing 402, though other embodiments are not so limited. The mechanical housing 402 may comprise stamped aluminium, for example, for lightweight electromagnetic shielding and mechanical confinement, though other embodiments are not so limited. The mechanical housing 402 may be thermally insulated to help control experiment temperatures.

The experiment module 400 may include a high definition video camera 404 and light emitting diodes (LEDs) 406 that light an experiment area for clear observation. The experiment module 400 may include a label with indicia (e.g., text, a logo, or a photo) denoting an organization related to the experiment, such as a sponsor that helped finance or develop an experiment or a school attended by users who design and/or operate the experiment. The label may be positioned within the experiment module 400 or on the mechanical housing 402. During execution of the experiment, a user's name or other identifier may be depicted on a display that is observable via a camera, and may be recorded in image or audiovisual form so that a user may have a memento of participation in the experiment.

In one embodiment, a quantity of phase-change material (e.g., plastic, wax, solder or other low melting point alloy) may be heated to a liquid state within an experiment module 400 and allowed to cool back to a solid state. The phase-change material may be initially shaped into a name or logo or slogan of a user or sponsor or other party related to the experiment. An image or audiovisual recording of the phase-change material floating in microgravity and then being processed in the experiment may be used as promotional material for a user or sponsor or other party related to the experiment. Both the display showing a user name or other indicia and the observable events occurring during the experiment may be recorded in image and audiovisual form to verify that a particular run of the experiment, designed by a particular user, was performed.

An experiment cube 408 (which need not actually be cubically shaped, but is currently implemented as a single standard 1 U size 10 cm cube) as shown may be associated with a "tier one" (or "experiments" tier) discussed above. The management server 204 as shown may be associated with a "master controller" (or "management server" tier) as discussed above. The management server 204 may communicate with the experiment cube 408 using an experiment control board, 410 as shown.

FIG. 4 also shows a cooling subsystem 412 which may include convection fans and heat conducting tubes (sometimes called heat pipes). An example heating and cooling embodiment is designed for efficient, controlled, and managed heating and cooling within two levels of containment. One example uses forced convection in an experiment volume that includes inner and outer compartments, allowing selective heat control of the inner compartment for scientific investigation, while providing a second outer compartment and containment for safety enhancement as well as an additional controlled environment. The heating and cooling system may use multiple automated temperature sensors in both containers, a programmable computing board, and heating and cooling elements, with a hardware casing and electronics to manage heating and cooling functions reliably.

One example of the experiment control board 410 may include a programmable Lego™ Mindstorms EV3. In an alternate example, an experiment control board 410 may provide a smaller form factor than the Lego™ Mindstorms EV3, but provides full compatibility with Lego™ Mindstorms EV3 programs, additional expandability and interfacing, additional flexibility to mix and match Lego™ software, non-Lego™ software, Lego™ sensors/motors, and non-Lego™ sensors/motors in one environment. One example utilizes modifications to the ev3dev kernel and includes a custom hardware shield.

The experiment cube 408 may also comprise a desiccant case 414. A desiccant is a water-absorbing material, such as a silica gel, which is widely known in the art. One embodiment may open the desiccant case 414 to the experiment cube 408 to reduce the relative humidity of the air (or other gas) within. The experiment cube 408 may have multiple separate compartments in which experiments may be performed in different humidity and temperature environments.

The desiccant may be heated to release captured water vapor. Ideally, the water or other fluid required for a given experiment module is conserved for re-use, although the ISS can provide water and various gases to the experiment modules.

The selectively applied desiccant concept is generally applicable to any gas absorbent material, such as may be used to absorb and/or re-emit carbon dioxide, for example, as a controlled aspect of an experiment. Similarly, an experiment module may reduce the oxygen content of a compartment by selectively opening access to an oxygen absorbent material, such as finely powdered iron or other material that oxidizes rapidly to act as a "getter" for the oxygen in the compartment.

Figure 5:
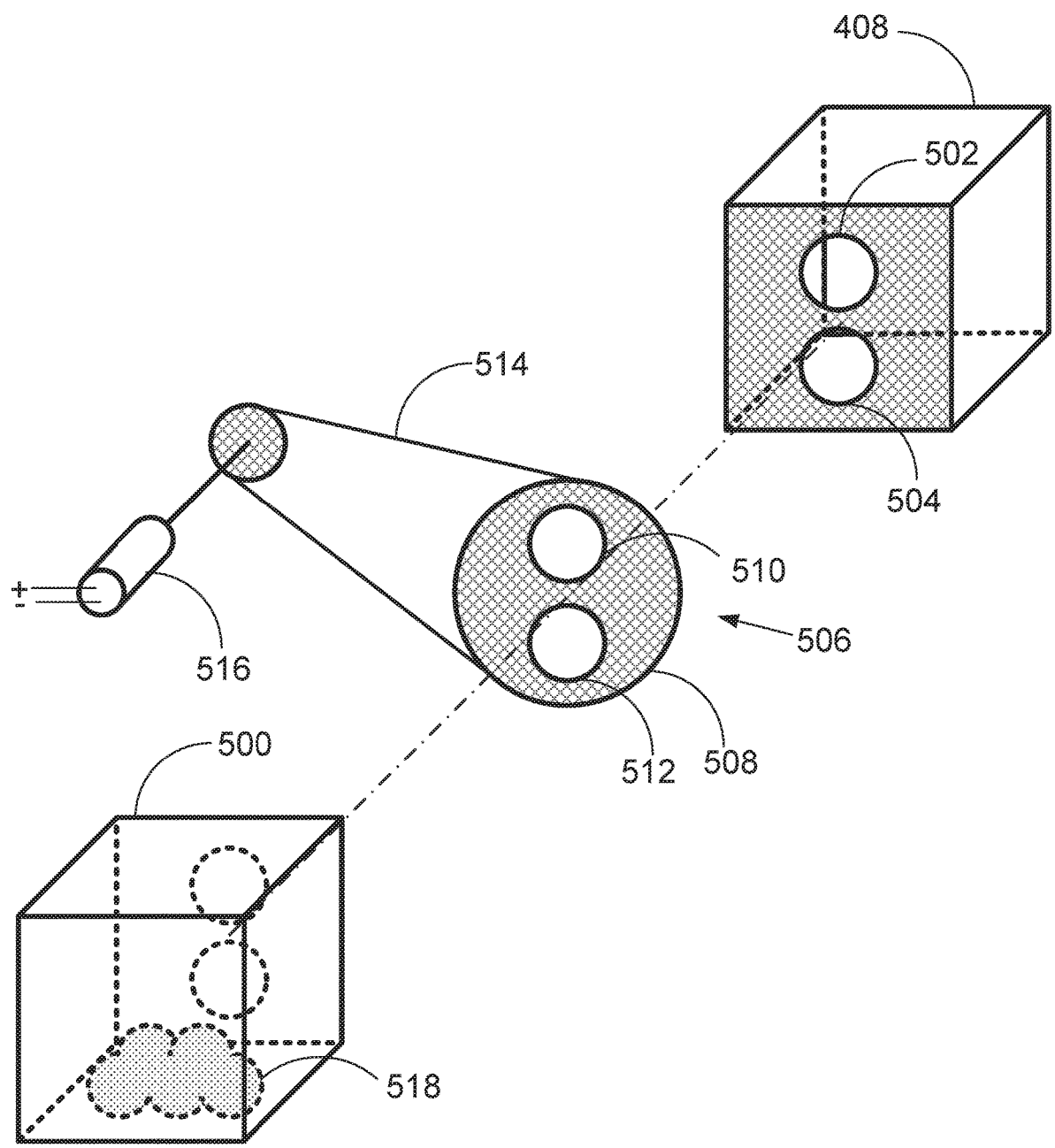
FIG. 5 shows an exploded diagram of an experiment cube and a variably connectable desiccant case, according to an embodiment.

FIG. 5 shows an exploded diagram of an experiment cube 408 and a variably connectable desiccant case 500, according to an embodiment. The experiment cube 408 may have two ventilation holes 502 and 504 in one wall. The desiccant case 500 may have similar holes on a facing wall, and further include a rotating valve 506 comprising a circular plate 508 with separate ventilation holes 510 and 512. Holes 502 and 510, for example, may provide an air intake path, while holes 504 and 512 provide an air outflow path.

The plate 508 may be rotated reliably, such as by a stepper motor 516 connected by a belt 514, relative to the experiment cube 408. The motor 516 may be programmably rotated in, for example, one degree increments in either direction, to govern airflow between the experiment cube 408 and a mesh bag 518 containing desiccant compounds inside the desiccant case 500. This automated valve arrangement supports multiple use cases including controlling humidity in the experiment cube 408 for purposes of scientific investigation. The humidity state may controlled by the motor 510 and measured by a humidity sensor.

Similar valve 506 arrangements may use actuators for locking and logic to detect a locked/unlocked state of the rotating plate. Different combinations of physically coincident transfer holes may enable multiple different desiccant case 500 states such as: closed, open to an outer housing, open to a first compartment, and open to a second compartment, for example. Other types of valves and hoses may also perform similar functions.

Figure 6:
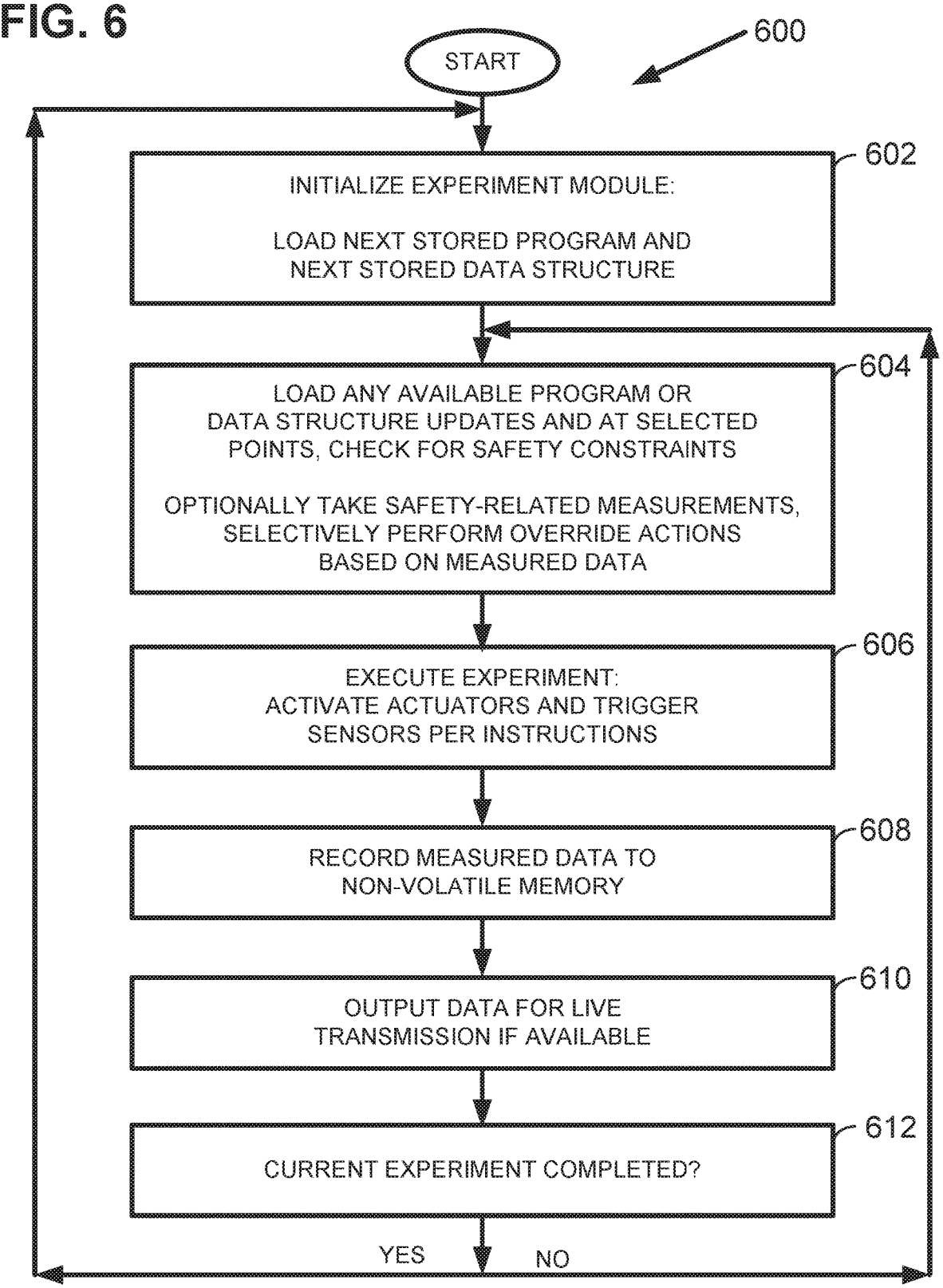
FIG. 6 shows a flowchart of example operations for an experimental platform, according to an embodiment.

FIG. 6 shows a flowchart for operation 600 of the experimental platform 102, according to an embodiment. At 602, the experimental platform 102 may initialize one or more of the experiment modules (206, 208) that it supports. A queue of experiment programs and user-defined data structures may be stored in the memory of each experiment module (206, 208). The experiment programs may have been created by a user 200, or may simply be "template" programs that previously existed and are customized by the user-defined data structure to govern the details of a particular experiment.

At 604, the experiment platform may check for any available program or data structure updates. For example, a user 200 may modify an experiment in real-time, perhaps based on measured data that was downloaded. Such modifications may require special testing for safety, in case a user has ordered a dangerous experimental condition. For example, if the user 200 specifies that a heater should be turned on until an experiment module component reached 2000° C. and safety constraints limit such temperatures to 200° F., the experiment module program may amend the user-defined data structure and/or program update to prevent an unsafe condition. The experiment module may also or instead suspend the experiment and send the user 200 an error message.

Similarly, the experiment module program may amend the user-defined data structure to automatically require that some safety-related measurements be made prior to continuing with scheduled experimental steps. For example, if a heater is to be activated during an experiment, the experiment module program may first require that a temperature reading be taken by a relevant sensor to determine the current temperature in the experiment module. If the current temperature is too close to a maximum allowed operating temperature, the experiment module program may trigger a corrective action, such as turning on a fan to cool down the experiment module before proceeding with any heater activation. The experiment module program may also check for any alarm signals, which may originate from its own sensors, from the management server 204, or even the space station 202. Thus, even in the absence of any program or user-defined data structure updates, and in spite of any previous review of an experiment, the experiment module may autonomously prevent problems. The experiment module may again suspend the experiment and send the user 200 an error message.

At 606, the experiment module program may proceed to execute the experiment. An experiment may comprise a sequence of operations involving activation or deactivation of various actuators and the triggering or suspension of data acquisition from various sensors. In the early days of remote experimentation, these operations were hard-coded into experimental circuitry, but later were stored in non-volatile memory as program instructions in dedicated spacecraft systems. Now, the details of an experiment specification may be provided in a control program for the experiment module, or in a user-defined data structure used by such a control program.

At 608, the experiment module program may record measured data from various experiment module sensors to memory, including a non-volatile memory. The use of non-volatile memory may help preserve measured data in the event of power glitches or other failures. Storage of measured data may also be required if there is no high speed download path immediately available to transmit the data back to the user 200. Thus, at 608, the experiment module program may output measured data for live transmission to the user 200, if such live transmission is available. The availability of real-time updating and real-time downlinking of measured data enables not only confirmation that updates have been received and are being followed, but allows for dynamic experimentation. That is, the sequence of actuator activations may be made highly dependent upon measured sensor data.

At 612, the experiment module program may determine if the current experiment has been completed. If not, the experiment module program may return to its post-initialization state, check for updates, perform any special actions to handle any constraint violations, and move onto the next aspect of the current experiment operations. If the current experiment has been completed, the experiment module program may return to the very beginning and begin to prepare for and process the next experiment. Ideally, every experiment module (206, 208) will be operated continuously for as long as it is deployed on the space station 202, to process as many experiments as possible and thus cut per-experiment costs as much as possible, so a halt to the experiment module program, which may actually occur, is not shown.

Figure 7:
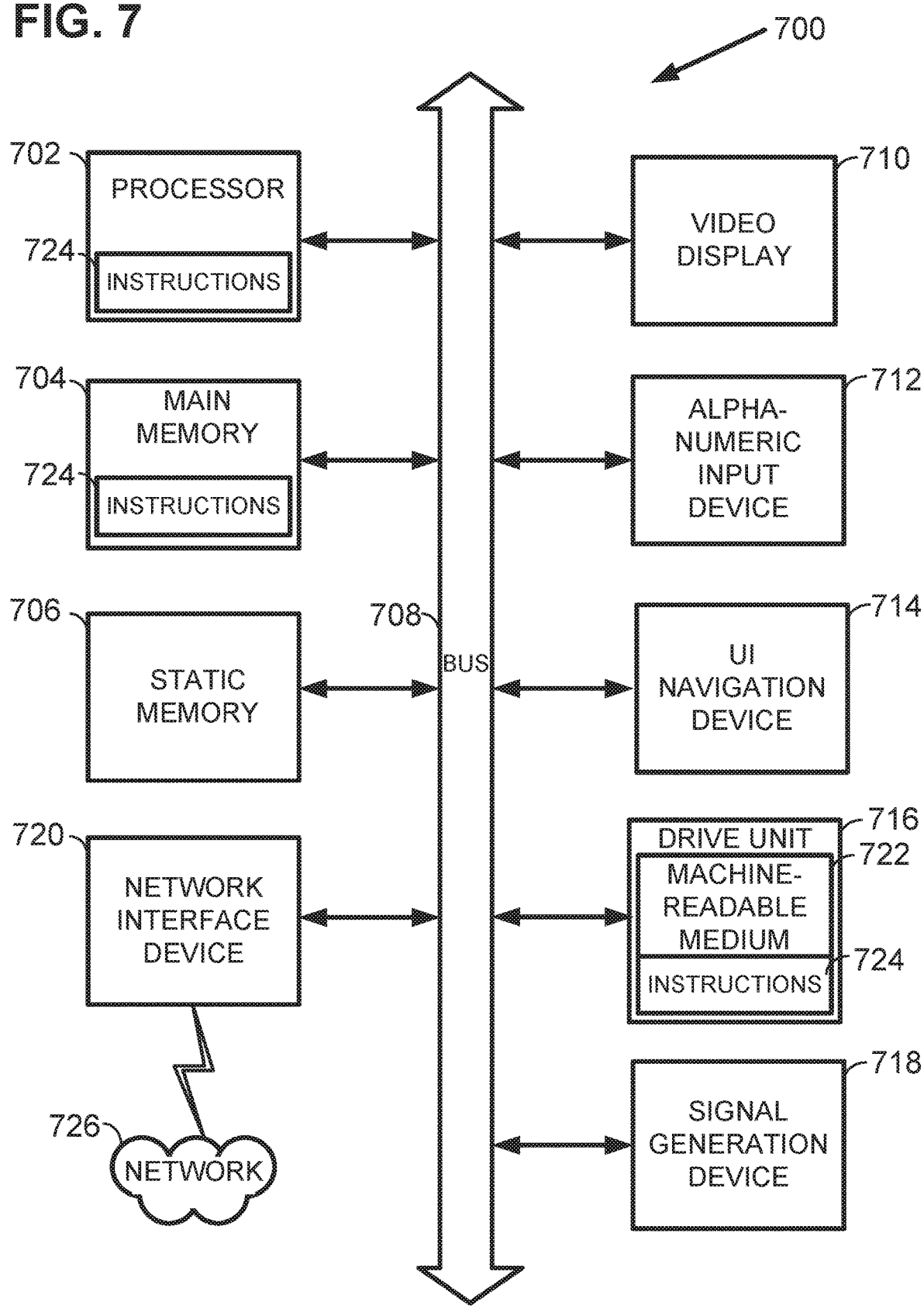
FIG. 7 shows a functional diagram, or example layout, of an experiment platform, according to an embodiment.

FIG. 7 shows a block diagram of a machine in the example form of a computer system 700 within which instructions for causing the machine to perform any one or more of the methodologies discussed herein may be executed. For example, the computer system 700 may be used to at least partially implement the above-described experiment platforms.

In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. A component is a tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Although an embodiment has been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An orbital experiment platform, comprising:
    an experiment module comprising:
        a memory storing control software;
        at least one processor, coupled to the memory, to execute the control software;
        actuators, coupled to and controllable by the at least one processor, operable in an experimental environment;
        sensors, coupled to and controllable by the at least one processor, that acquire experiment data pertaining to the experimental environment,
        the experiment module being operable in microgravity to perform an experiment according to an experiment data structure specifying a sequence of parameterized operations governing the actuators and the sensors; and
    a hardware-implemented management server providing data transfer services between the experiment module and an orbiting space station.

2. The experiment platform of claim 1, wherein the data transfer services transfer the experiment data in near real-time.

3. The experiment platform of claim 1, wherein the data transfer services transfer the experiment data structure in near real-time.

4. The experiment platform of claim 1, further comprising a second, corresponding, non-orbital experiment module to perform the experiment in a non-microgravity environment.

5. The experiment platform of claim 1, the experiment module further comprising a desiccant case that selectively modifies a humidity of the experimental environment.

6. The experiment platform of claim 1, wherein the experiment data structure is dynamically reconfigurable, including during experiment execution.

7. The experiment platform of claim 1, wherein a user programs and uploads the control software.

8. A method for performing an experiment by proxy, comprising:
    defining an experiment according to an experiment data structure, the experiment data structure comprising a sequence of parameterized operations for programmatic execution by a platform having at least one processor, control software stored in a memory coupled to the at least one processor, actuators coupled to and controllable by the at least one processor and operable in an experimental environment, and sensors coupled to and controllable by the at least one processor that acquire experiment data relating to the experimental environment;
    communicating the experiment to an orbital platform and to a corresponding non-orbital platform;
    executing the experiment separately with each of the orbital and non-orbital platforms in accordance with the experiment data structure;
    transmitting the experiment data from at least one of the executions; and
    differentiating the experiment data from each of the platforms to determine the influence of gravity on the experiment.

9. The method of claim 8, further comprising comparing the determined influence to a predicted influence to test a hypothesis.

10. The method of claim 8, wherein the transmitting is in near real-time.

11. The method of claim 8, further comprising dynamically reconfiguring the experiment by modifying the experiment data structure.

12. The method of claim 8, wherein a user programs and uploads the control software.

13. The method of claim 8, wherein the actuators include a desiccant case that selectively modifies a humidity of the experimental environment.

14. A non-transitory computer-readable medium containing instructions that, when executed by a processor, perform operations comprising:
    defining an experiment according to an experiment data structure, the experiment data structure comprising a sequence of parameterized operations for programmatic execution by a platform having at least one processor, control software stored in a memory coupled to the at least one processor, actuators coupled to and controllable by the at least one processor and operable in an experimental environment, and sensors coupled to and controllable by the at least one processor that acquire experiment data in the experimental environment;
    communicating the experiment to an orbital platform and to a similar non-orbital platform;
    executing the experiment separately with each of the platforms in accordance with the experiment data structure;
    transmitting the experiment data from at least one of the executions; and
    differentiating the experiment data from each of the platforms to determine the influence of gravity on the experiment.

15. The non-transitory computer-readable medium of claim 14, further comprising operations comparing the determined influence to a predicted influence to test a hypothesis.

16. The non-transitory computer-readable medium of claim 14, wherein the transmitting is in near real-time.

17. The non-transitory computer-readable medium of claim 14, further comprising dynamically reconfiguring the experiment by modifying the experiment data structure.

18. The non-transitory computer-readable medium of claim 14, wherein a user programs and uploads the control software.

19. The non-transitory computer-readable medium of claim 14, further comprising selectively modifying a humidity of the experimental environment with a desiccant case.

20. A system for performing an experiment by proxy, comprising:
    means for defining an experiment according to a data structure, the data structure comprising a sequence of parameterized operations for programmatic execution by a platform having at least one processor, control software stored in a memory coupled to the at least one processor, actuators coupled to and controllable by the at least one processor and operable in an experimental environment, and sensors coupled to and controllable by the at least one processor that acquire experiment data relating to the experimental environment;
    means for communicating the experiment to an orbital platform and to a corresponding non-orbital platform;

means for executing the experiment separately with each of the orbital and non-orbital platforms in accordance with the data structure;
means for transmitting the experiment data from at least one of the executions; and
means for differentiating the experiment data from each of the platforms to determine the influence of gravity on the experiment.

\* \* \* \* \*